(12) United States Patent
Xu et al.

(10) Patent No.: US 11,298,669 B2
(45) Date of Patent: *Apr. 12, 2022

(54) SCALE COLLECTION DEVICE FOR DOWNFLOW REACTORS

(71) Applicant: UOP LLC, Des Plaines, IL (US)

(72) Inventors: Zhanping Xu, Inverness, IL (US); Steven J. Lesniak, Chicago, IL (US); Robert L. Bunting, Jr., Chicago, IL (US)

(73) Assignee: UOP LLC, Des Plaines, IL (US)

( * ) Notice: Subject to any disclaimer, the term of this patent is extended or adjusted under 35 U.S.C. 154(b) by 592 days.

This patent is subject to a terminal disclaimer.

(21) Appl. No.: 16/221,197

(22) Filed: Dec. 14, 2018

(65) Prior Publication Data

US 2019/0232199 A1 Aug. 1, 2019

Related U.S. Application Data

(60) Provisional application No. 62/609,303, filed on Dec. 21, 2017.

(51) Int. Cl.
| | | |
|---|---|---|
| *B01J 8/00* | (2006.01) | |
| *B01D 21/00* | (2006.01) | |
| *B01J 8/02* | (2006.01) | |
| *B01D 17/02* | (2006.01) | |
| *B01D 19/00* | (2006.01) | |

(52) U.S. Cl.
CPC ............ *B01J 8/0085* (2013.01); *B01D 17/02* (2013.01); *B01D 21/0042* (2013.01); *B01D 21/0045* (2013.01); *B01J 8/007* (2013.01); *B01J 8/009* (2013.01); *B01J 8/0242* (2013.01); *B01J 8/0257* (2013.01); *B01J 8/0278* (2013.01); *B01D 19/0068* (2013.01); *B01J 2208/00796* (2013.01); *B01J 2208/00938* (2013.01)

(58) Field of Classification Search
CPC ................ B01D 17/02; B01D 19/0068; B01D 21/0042; B01D 21/0045; B01D 24/183; B01J 8/007; B01J 8/0085; B01J 8/009; B01J 8/0242; B01J 8/0257; B01J 8/0278; B01J 2208/00796; B01J 2208/00938; B01J 2208/0092
See application file for complete search history.

(56) References Cited

U.S. PATENT DOCUMENTS

| | | | |
|---|---|---|---|
| 3,607,000 A | 9/1971 | Beal et al. | |
| 4,380,529 A | 4/1983 | Gupta | |
| 4,836,989 A | 6/1989 | Aly et al. | |
| 5,158,714 A | 10/1992 | Shih et al. | |

(Continued)

FOREIGN PATENT DOCUMENTS

| | | |
|---|---|---|
| CN | 1765478 A | 5/2006 |
| CN | 101279226 A | 10/2008 |

(Continued)

OTHER PUBLICATIONS

International Search Report and Written Opinion from corresponding PCT Application No. PCT/US2018/066666, dated Apr. 4, 2019.

(Continued)

*Primary Examiner* — Lessanework Seifu

(57) ABSTRACT

The invention involves a scale collection device that is located within downflow reactor head for removing solids from feed streams to increase reactor operating cycle time without impact on effective reactor space for catalyst loading. More particularly, a filtering zone is located in an upper portion of a reactor vessel above a rough liquid distribution tray and a distribution tray.

22 Claims, 1 Drawing Sheet

(56) References Cited

U.S. PATENT DOCUMENTS

| | | | |
|---|---|---|---|
| 5,484,578 | A | 1/1996 | Muldowney et al. |
| 8,181,942 | B2 | 5/2012 | Sechrist |
| 8,487,151 | B2 | 7/2013 | Koudil et al. |
| 8,673,246 | B2 | 3/2014 | Chen et al. |
| 9,364,810 | B2 | 6/2016 | Merkel et al. |
| 9,480,957 | B2 | 11/2016 | Bazer-Bachi et al. |
| 2004/0097756 | A1 | 5/2004 | Thiel et al. |
| 2011/0092754 | A1 | 4/2011 | Koudil et al. |
| 2011/0201856 | A1 | 8/2011 | Cottard et al. |
| 2012/0269699 | A1 | 10/2012 | Kumar et al. |
| 2013/0296610 | A1 | 11/2013 | Merkel et al. |
| 2014/0097125 | A1 | 4/2014 | Bazer-Bachi et al. |
| 2015/0004074 | A1 | 1/2015 | Lesniak et al. |
| 2017/0015917 | A1 | 1/2017 | Muller |

FOREIGN PATENT DOCUMENTS

| | | |
|---|---|---|
| CN | 103131472 A | 6/2013 |
| CN | 204234070 U | 4/2015 |
| EP | 0050505 A2 | 4/1982 |
| EP | 2918332 A1 | 9/2015 |
| WO | 2006076923 A1 | 7/2006 |
| WO | 2007023225 A1 | 3/2007 |
| WO | 2015036066 A1 | 3/2015 |
| WO | 2015136066 A1 | 9/2015 |
| WO | 2017080756 A1 | 5/2017 |

OTHER PUBLICATIONS

International Search Report and Written Opinion from corresponding PCT Application No. PCT/US2018/066659, dated Mar. 28, 2019.
International Search Report and Written Opinion from corresponding PCT Application No. PCT/US2018/066684, dated Mar. 21, 2019.
International Search Report and Written Opinion from corresponding PCT Application No. PCT/US2018/066663, dated Mar. 28, 2019.
International Search Report and Written Opinion from corresponding PCT Application No. PCT/US2018/066678, dated Apr. 4, 2019.
International Search Report and Written Opinion from corresponding PCT Application No. PCT/US2018/066682, dated Apr. 4, 2019.
International Preliminary Report on Patentability from corresponding PCT Application No. PCT/US2018/066666, dated Jun. 23, 2020.
International Preliminary Report on Patentability from corresponding PCT Application No. PCT/US2018/066659, dated Jun. 23, 2020.
International Preliminary Report on Patentability from corresponding PCT Application No. PCT/US2018/066674, dated Jun. 23, 2020.
International Preliminary Report on Patentability from corresponding PCT Application No. PCT/US2018/066663, dated Jun. 23, 2020.
International Preliminary Report on Patentability from corresponding PCT Application No. PCT/US2018/066678, dated Jun. 23, 2020.
International Preliminary Report on Patentability from corresponding PCT Application No. PCT/US2018/066682, dated Jun. 23, 2020.
Extended European Search report from corresponding European application No. 18891437.8 dated Jul. 30, 2021.
Li, Dadong, Hydrotreating Processes and Engineering, China Petrochemical Press, Dec. 2004.
Extended European Search report from European application No. 18892042.5 dated Aug. 9, 2021.

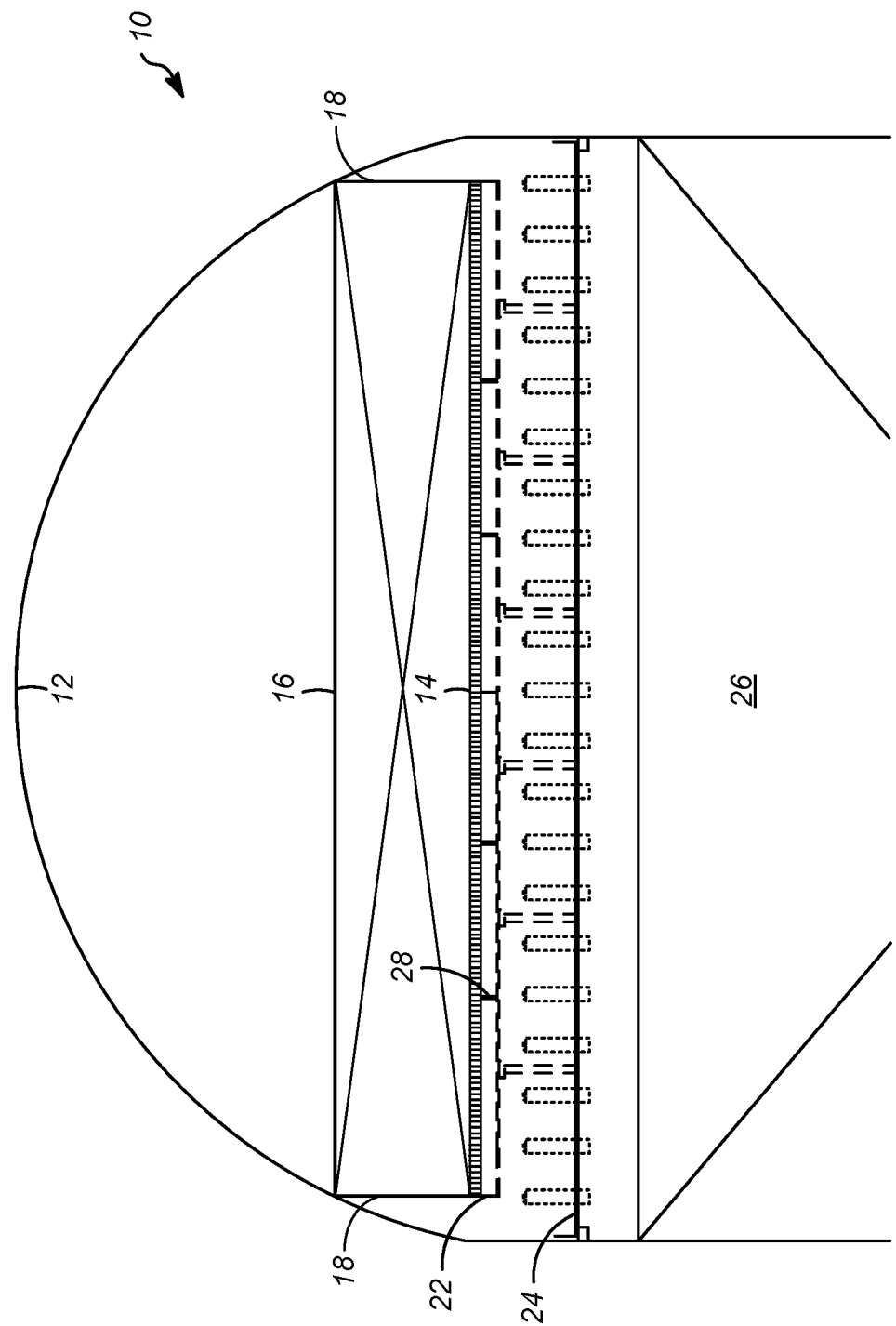

SCALE COLLECTION DEVICE FOR DOWNFLOW REACTORS

CROSS-REFERENCE TO RELATED APPLICATION

This application claims priority from U.S. Provisional Application No. 62/609,303 filed Dec. 21, 2017, the contents of which cited application are hereby incorporated by reference in its entirety.

FIELD OF THE INVENTION

The invention relates to a device for improved operation of downflow reactors. More particularly, the invention involves a scale collection device that is located within downflow reactor head for removing solids from feed streams to increase reactor operating cycle time without impact on effective reactor space for catalyst loading.

BACKGROUND OF THE INVENTION

In downflow reactors, such as downflow reactors, a layer of filtering material is often placed on top of the first catalyst bed to catch particles such as fines and scales. Typically, this layer may be 6 to 36 inches thick and reduces the space available for the catalyst to take up. In addition, the filtering material has to be removed and replaced within an operating cycle when solids accumulates within the layer of filtering material or between the filtering material and catalyst bed causing high pressure drop.

SUMMARY OF THE INVENTION

The invention involves a reactor comprising an upper portion and a lower portion wherein the upper portion contains a scale collection device. A filtering zone is located above a rough liquid distribution tray and wherein a vapor-liquid distribution tray is located below said rough liquid distribution tray and wherein the lower portion contains a catalyst bed. The filtering zone may comprise a single layer or multiple layers of filtering materials having the same or different physical and chemical properties. The filtering zone contains porous ceramic pellets or other materials that achieve a similar function. The filtering zone may be spaced above the rough liquid distribution tray by a plurality of spacers.

BRIEF DESCRIPTION OF THE DRAWING

The FIGURE shows the upper portion of a reactor showing filtering material located above the distribution trays.

DETAILED DESCRIPTION OF THE INVENTION

It has now been found that a different arrangement is preferred to filter particles from a feed stream in a downflow reactor. In addition to having a layer of filtering material on top of the catalyst, it has been found advantageous to include a layer of filtering material in the upper portion of the reactor above the distribution trays. More particularly, a scale collection device is located within an upper portion of a downflow reactor or reactor head for removing solids from feed streams and to increase reactor operating cycle time without any impact on the amount of effective reactor space for catalyst loading. This is achieved by a specially designed scale collection device located within a reactor head. As shown in the FIGURE, the scale collection device is constructed with a cylindrical side wall 18 and a grating 14 at bottom spaced a small distance above a rough liquid distribution tray (RLDT) 22. A filtering material fills the space above grating 14 and inside the cylindrical side wall 18. The top of cylindrical side wall 18 is extended up to reactor top head 12 and part of the side wall 18 at top has openings such as slots, notches or holes for gas bypassing majority of the filtering material. Alternatively, a clearance is left between the top of the cylindrical wall 18 and the reactor top head 12 for gas bypassing the filtering material. There may be a hold-down grid at top of the filtering material to keep it from moving around.

Gas and liquid enter into the reactor 10 through an inlet distributor. The inlet flow stream may be straightened vertically downwards by an orifice plate at top of the distributor. The liquid is distributed across the top of the filtering material. Gas is separated from liquid in the space between the inlet distributor and top of the filtering material. The liquid flows downward through the filtering material while the gas through an annular area between the cylindrical side wall 18 and reactor head 12. With gas bypassing the filtering material, the pressure drop will not increase even with the filtering material filled with solids.

With this design, the reactor cycle time can be increased by the additional filter bed within top reactor head 12 or catalyst loading increased by reducing the filter material on top of the catalyst bed 26. Liquid should be distributed uniformly across top of the filter bed to maximize its solid removal capability.

The liquid out of the scale collection device is redistributed by the rough liquid distribution tray 22 below. Gas and liquid are then distributed through a vapor-liquid distribution tray 24 in fluid communication with the rough liquid distribution tray 22 to the catalyst bed 26.

The rough liquid distribution tray 22 includes an upper liquid retention baffle.

As shown in the FIGURE, according to one or more embodiments of the present invention, in order to remove the solid scales and fines in a liquid stream from within reactor 10 is shown an outer reactor shell having a rounded upper portion. The lower portion of reactor 10 contains a catalyst bed 26. A filtering zone 16 is shown on top of grating 14. The grating 14 is supported by several supports or spacers 28 and is located a small distance above rough liquid distribution tray 22 that has a series of openings. Sections of the grating 14 are placed within the cylindrical side wall 18 for supporting filtering material in filtering zone 16. The cylindrical side wall 18 is attached to a rough liquid distribution tray 22 liquid retention baffle. The cylindrical side wall 18 can also be the extension of the rough liquid distribution tray 22 liquid retention baffle so that the cylindrical wall 18 and the rough liquid distribution tray 22 liquid retention baffle are combined into a single cylindrical wall 18 to retain liquid on the rough liquid distribution tray 22 and the filtering material in the filtering zone 16. The cylindrical side wall 18 can be extended up to the reactor head 12 with openings such as holes or slots at top for vapor to pass through the annular zone between the top of the cylindrical side wall 18 and the reactor head 12. The openings on the cylindrical side wall 18 are sized for retaining filtering materials within the cylindrical side wall 18. The top of the filtering zone 16 containing filtering materials is below top of the cylindrical side wall 18. The grating 14 is mostly open (over 50%) for liquid to flow through to the rough liquid distribution tray 22. Liquid overflow pipes may be attached to the support grating 14 extending up through the filtering zone 16 for liquid overflow in case the filter zone 16 is plugged and liquid cannot flow through. The top of the overflow pipes should be lower than top of cylindrical side wall 18 so that liquid can only overflow through the pipes, not the top of cylindrical wall 18, and the overflow liquid can be redistributed by the rough liquid distribution tray 22 before passing down to the vapor-liquid distribution tray 24. Gas and liquid then pass below into catalyst bed 26. The filtering zone 16 is designed so that the supports 28 of the grating 14 provide minimal resistance to radial liquid flow on rough liquid distribution tray 22 so that liquid can be re-distributed across the rough liquid distribution tray 22.

The filter material used in the filtering zone 16 may comprise pellets, sheets or other configuration of a porous material as known in the art. Preferred materials for the filtering zone 16 are ceramic pellets which have a high internal porosity, such as the products available from Crystaphase Technologies, Inc., located in Houston, Tex. USA. Other filtering materials may be used, for example, membrane filters, sand filters, and other similar filter materials. In accordance with a preferred embodiment, the filtering zone 16 contains one or multiple layers of filter materials with the same or different physical and chemical properties. The grating 14, upon which the porous material is supported, has openings that are smaller than the size of the porous material pellets or other configuration. With respect to the collection of the solid materials from the liquid, the configuration also reduces the tendency of rough liquid distribution tray 22 and vapor-liquid distribution tray 24 being plugged by solids.

Specific Embodiments

While the following is described in conjunction with specific embodiments, it will be understood that this description is intended to illustrate and not limit the scope of the preceding description and the appended claims.

A first embodiment of the invention is an apparatus comprising an upper portion and a lower portion wherein the upper portion contains a scale collection device wherein a filtering zone is located above a rough liquid distribution tray and wherein a vapor-liquid distribution tray is located below the rough liquid distribution tray, wherein the upper portion comprises a cylindrical side wall which is coupled to the rough liquid distribution tray. An embodiment of the invention is one, any or all of prior embodiments in this paragraph up through the first embodiment in this paragraph, wherein the cylindrical side wall extended up to reactor top head. An embodiment of the invention is one, any or all of prior embodiments in this paragraph up through the first embodiment in this paragraph, wherein the top of the cylindrical side wall contains holes or slots or cuts. An embodiment of the invention is one, any or all of prior embodiments in this paragraph up through the first embodiment in this paragraph, wherein the lower portion contains a catalyst bed. An embodiment of the invention is one, any or all of prior embodiments in this paragraph up through the first embodiment in this paragraph, wherein the lower portion contains a medium. An embodiment of the invention is one, any or all of prior embodiments in this paragraph up through the first embodiment in this paragraph, wherein the lower portion contains a packing. An embodiment of the invention is one, any or all of prior embodiments in this paragraph up through the first embodiment in this paragraph, wherein the filtering zone comprises one layer of filtering material having the same physical and chemical properties. An embodiment of the invention is one, any or all of prior embodiments in this paragraph up through the first embodiment in this paragraph, wherein the filtering zone comprises multiple layers of filtering material having different physical and chemical properties. An embodiment of the invention is one, any or all of prior embodiments in this paragraph up through the first embodiment in this paragraph, wherein the filtering zone comprises porous ceramic pellets. An embodiment of the invention is one, any or all of prior embodiments in this paragraph up through the first embodiment in this paragraph, wherein the filtering zone is spaced above the rough liquid distribution tray by a plurality of spacers. An embodiment of the invention is one, any or all of prior embodiments in this paragraph up through the first embodiment in this paragraph, wherein the spacers are coupled to the rough liquid distribution tray. An embodiment of the invention is one, any or all of prior embodiments in this paragraph up through the first embodiment in this paragraph, wherein the filtering zone comprises a plurality of liquid overflow chimneys. An embodiment of the invention is one, any or all of prior embodiments in this paragraph up through the first embodiment in this paragraph, wherein the top of overflow chimneys contain slots, wherein the slots may be V-shaped. An embodiment of the invention is one, any or all of prior embodiments in this paragraph up through the first embodiment in this paragraph, wherein the top of overflow chimneys contain cuts. An embodiment of the invention is one, any or all of prior embodiments in this paragraph up through the first embodiment in this paragraph, wherein the overflow chimneys contain holes. An embodiment of the invention is one, any or all of prior embodiments in this paragraph up through the first embodiment in this paragraph, wherein the overflow chimneys may contain caps. An embodiment of the invention is one, any or all of prior embodiments in this paragraph up through the first embodiment in this paragraph, wherein the rough liquid distribution tray contains holes sized to generate the desired liquid level on the rough liquid distribution tray.

A second embodiment of the invention is an apparatus comprising an upper portion and a lower portion wherein the upper portion contains a scale collection device wherein a filtering zone is located above a rough liquid distribution tray and wherein a vapor-liquid distribution tray is located below the rough liquid distribution tray, wherein the upper portion comprises a cylindrical side wall which is coupled to the rough liquid distribution tray. An embodiment of the invention is one, any or all of prior embodiments in this paragraph up through the second embodiment in this paragraph, wherein the top of liquid overflow chimneys contain slots, wherein the slots may be V-shaped. An embodiment of the invention is one, any or all of prior embodiments in this paragraph up through the second embodiment in this paragraph, wherein the top of liquid overflow chimneys contain cuts. An embodiment of the invention is one, any or all of prior embodiments in this paragraph up through the second embodiment in this paragraph, wherein the overflow chimneys contain holes. An embodiment of the invention is one, any or all of prior embodiments in this paragraph up through the second embodiment in this paragraph, wherein the overflow chimneys may contain caps. An embodiment of the invention is one, any or all of prior embodiments in this paragraph up through the second embodiment in this paragraph, wherein the rough liquid distribution tray contains holes sized to generate the desired liquid level on the rough liquid distribution tray.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

The invention claimed is:

1. A reactor comprising an upper portion and a lower portion wherein the upper portion comprises:
    a rough liquid distribution tray comprising a cylindrical side wall coupled to the rough liquid distribution tray, wherein the cylindrical side wall extends upward to a reactor top head;
    a scale collection device comprising a filter defined by the cylindrical side wall and a grating, the grating supported by a plurality of spacers above the rough liquid distribution tray; and
    a vapor-liquid distribution tray located below the rough liquid distribution tray.

2. The reactor of claim 1, wherein the top of the cylindrical side wall contains holes or slots or cuts.

3. The reactor of claim 1, wherein the lower portion contains a catalyst bed.

4. The reactor of claim 1, wherein the lower portion contains a medium.

5. The reactor of claim 1, wherein the lower portion contains a packing.

6. The reactor of claim 1, wherein the filter comprises one layer of filtering material having the same physical and chemical properties.

7. The reactor of claim 1, wherein the filter comprises multiple layers of filtering material having different physical and chemical properties.

8. The reactor of claim 1, wherein the filter comprises porous ceramic pellets.

9. The reactor of claim 1, wherein the spacers are coupled to the rough liquid distribution tray.

10. The reactor of claim 1, wherein the filter comprises a plurality of liquid overflow chimneys.

11. The reactor of claim 10, wherein the top of the overflow chimneys contains slots.

12. The reactor of claim 10, wherein the top of the overflow chimneys contains cuts.

13. The reactor of claim 10, wherein the top of the overflow chimneys contains holes.

14. The reactor of claim 10, wherein there are caps on the overflow chimneys.

15. The reactor of claim 1, wherein the rough liquid distribution tray contains holes sized to generate the desired liquid level on the rough liquid distribution tray.

16. The reactor of claim 1 wherein the cylindrical side wall comprises an outer edge of the rough liquid distribution tray.

17. An apparatus comprising an upper portion and a lower portion wherein the upper portion comprising:
    a rough liquid distribution tray comprising a cylindrical side wall coupled to the rough liquid distribution tray, wherein the cylindrical side wall extends upward to a reactor top head, wherein a top part of the cylindrical side wall contains openings, and wherein the cylindrical side wall comprises an outer edge of the rough liquid distribution tray;
    a scale collection device comprising a filter defined by the cylindrical side wall and a grating, the grating supported by a spacer above the rough liquid distribution tray; and
    a vapor-liquid distribution tray located below the rough liquid distribution tray.

18. The apparatus of claim 17, wherein the filter comprises a plurality of liquid overflow chimneys, and wherein the top of the liquid overflow chimneys contains slots, wherein the slots are V-shaped.

19. The apparatus of claim 17, wherein the filter comprises a plurality of liquid overflow chimneys, and wherein the top of the liquid overflow chimneys contains cuts.

20. The apparatus of claim 17, wherein the filter comprises a plurality of liquid overflow chimneys, and wherein the top of the overflow chimneys contain holes.

21. The apparatus of claim 17, wherein the filter comprises a plurality of liquid overflow chimneys, and wherein there are caps on the overflow chimneys.

22. The apparatus of claim 17, wherein the rough liquid distribution tray contains holes sized to generate the desired liquid level on the rough liquid distribution tray.

* * * * *